(12) United States Patent
Olson et al.

(10) Patent No.: US 12,427,424 B2
(45) Date of Patent: Sep. 30, 2025

(54) HYPER-PERSONALIZED GAME ITEMS

(71) Applicant: Sony Interactive Entertainment LLC, San Mateo, CA (US)

(72) Inventors: Joseph Logan Olson, San Mateo, CA (US); Mathieu Leduc, Montreal (CA); Frederic Masson, Montreal (CA)

(73) Assignee: Sony Interactive Entertainment LLC

( * ) Notice: Subject to any disclaimer, the term of this patent is extended or adjusted under 35 U.S.C. 154(b) by 318 days.

(21) Appl. No.: 17/938,322

(22) Filed: Oct. 5, 2022

(65) Prior Publication Data

US 2024/0115954 A1    Apr. 11, 2024

(51) Int. Cl.
*A63F 13/69* (2014.01)
*A63F 13/52* (2014.01)
*G06T 17/20* (2006.01)

(52) U.S. Cl.
CPC .............. *A63F 13/69* (2014.09); *A63F 13/52* (2014.09); *G06T 17/20* (2013.01)

(58) Field of Classification Search
CPC ........... A63F 13/69; A63F 13/52; G06T 17/20
See application file for complete search history.

(56) References Cited

U.S. PATENT DOCUMENTS

| | | | | |
|---|---|---|---|---|
| 11,967,024 B2* | 4/2024 | Munkberg | ............. | G06N 3/045 |
| 2019/0279411 A1* | 9/2019 | Mitchell | .............. | G06V 40/166 |
| 2022/0036153 A1 | 2/2022 | O'Malia et al. | | |
| 2022/0172424 A1* | 6/2022 | Vircíková | .............. | G06N 3/047 |
| 2022/0180602 A1* | 6/2022 | Hao | ........................ | G06T 11/00 |
| 2022/0269867 A1 | 8/2022 | Yang et al. | | |
| 2022/0284662 A1* | 9/2022 | Bond | ...................... | G06N 20/00 |
| 2022/0414959 A1* | 12/2022 | Peng | .................... | G06V 10/774 |
| 2023/0052645 A1* | 2/2023 | Keller | ...................... | G06N 3/08 |
| 2023/0334071 A1 | 10/2023 | Whitehead, Jr. et al. | | |
| 2023/0334754 A1* | 10/2023 | Kirchmayer | ............ | G06T 17/00 |
| 2023/0343014 A1* | 10/2023 | Ummenhofer | ......... | G06N 3/088 |
| 2024/0005617 A1* | 1/2024 | Shakhrai | .................. | G06T 7/40 |
| 2024/0046569 A1* | 2/2024 | Choi | ....................... | G06T 17/20 |
| 2024/0112403 A1* | 4/2024 | Olson | ..................... | G06T 17/20 |
| 2024/0115954 A1* | 4/2024 | Olson | ..................... | G06T 19/20 |

OTHER PUBLICATIONS

"International Search Report and Written Opinion", dated Apr. 12, 2034, from the counterpart PCT application PCT/US23/75749.
Tewari et al. "Advances in Neural Rendering", Mar. 30, 2022, Retrieved from the Internet , entire document.
(Continued)

*Primary Examiner* — Malina D. Blaise
(74) *Attorney, Agent, or Firm* — Kilpatrick Townsend & Stockton LLP

(57) ABSTRACT

Two dimensional images are converted to a 3D neural radiance field (NeRF), which is modified based on text personalized to a player and input to resemble the accoutrement for a character demanded by the text. A model scores how well an image matches a line of text to produce a final 3D NeRF, which may be converted to a polygonal mesh and imported into a computer simulation such as a computer game.

20 Claims, 11 Drawing Sheets

(56) References Cited

OTHER PUBLICATIONS

Alec Radford, Jong Wook Kim, Chris Hallacy, Aditya Ramesh, Gabriel Goh, Sandhini Agarwal, Girish Sastry, Amanda Askell, Pamela Mishkin, Jack Clark, Gretchen Krueger, Ilya Sutskever, "Proceedings of the 38th International Conference on Machine Learning", PMLR 139:8748-8763, 2021.
Dellaert, Frank, "NeRF at CVPR 2022", Jun. 1, 2022, retrieved from https://dellaert.github.io/NeRF22/.
Jain et al., "Zero-Shot Text-Guided Object Generation with Dream Fields", CVPR 2022. 13 pages. Website: https://ajayj.com/dreamfield.
Olson et al., "Rapid Generation of 3D Heads With Natural Language", file history of related U.S. Appl. No. 17/937,418, filed Sep. 30, 2022. (1275-051).
Poole et al., "Dreamfusion: TEXT-TO-3D Using 2D Diffusion", Google Research, UC Berkeley, Sep. 29, 2022.

\* cited by examiner

"Old Tough Guy"

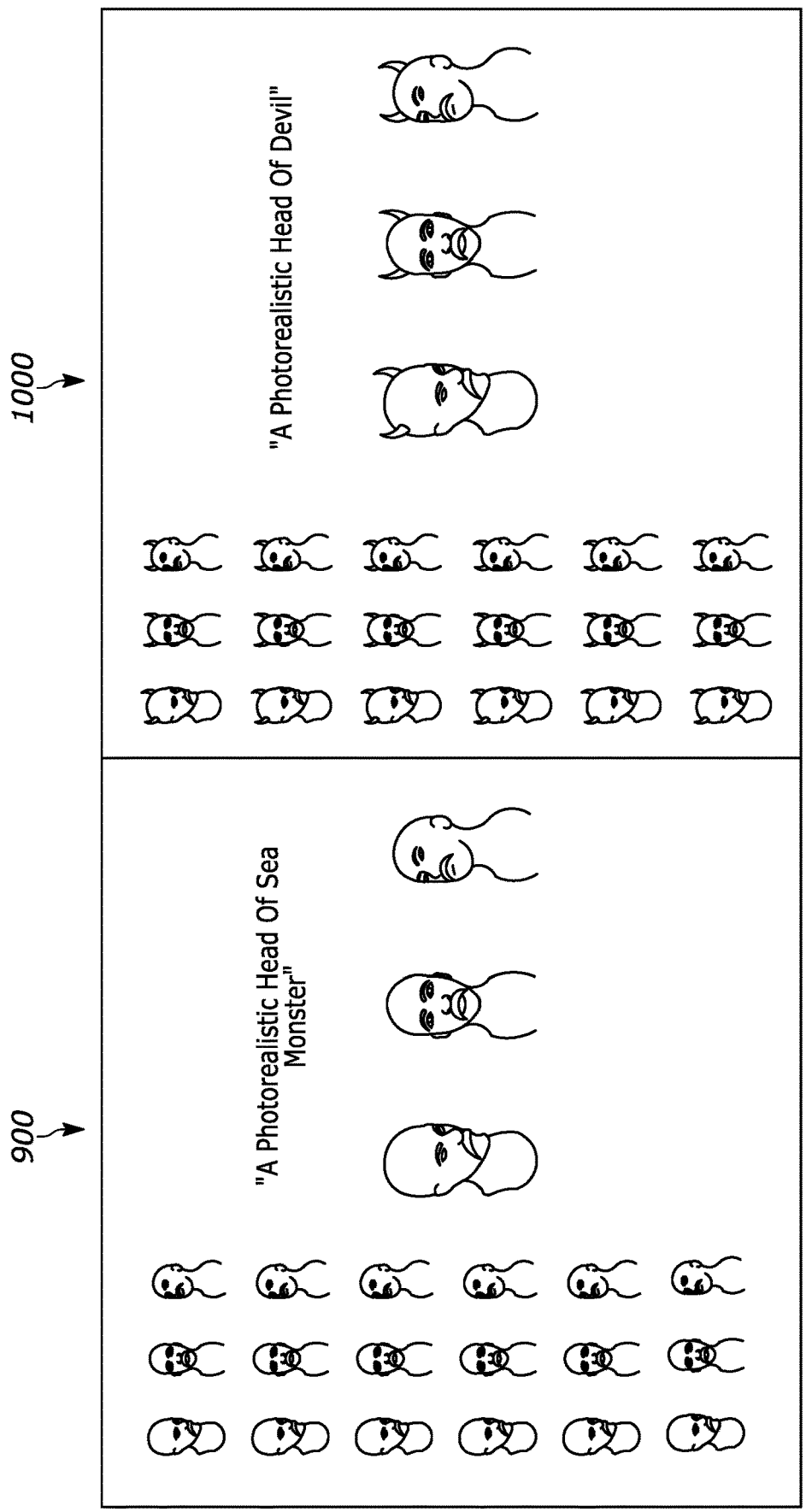

US 12,427,424 B2

HYPER-PERSONALIZED GAME ITEMS

FIELD

The present application relates generally to the rapid generation of hyper-personalized game items.

BACKGROUND

As understood herein, creating characters such as non-player characters (NPC) and their accoutrements for computer simulations such as computer games can be time-consuming.

SUMMARY

As further understood herein, it would be desirable to enable a game developer to create characters and accoutrements for video games in an easy, fast, and intuitive manner.

Accordingly, a device includes at least one computer storage that is not a transitory signal and that in turn includes instructions executable by at least one processor to generate a base mesh or neural radiance field (NeRF) from plural images. Note that techniques for text-to-2D image (e.g., stable diffusion) or text-to-mesh directly may be used, but in all embodiments the technique is applied to real-time creation of hyper personalized in-game items.

In the context of NeRF, the instructions are executable to use text input to a Contrastive Language-Image Pre-training (CLIP) model to generate a modified NeRF from the base NeRF, and convert the modified NeRF to a polygonal mesh representing a virtual character accoutrement for presentation of the accoutrement in at least one computer simulation.

In some examples the CLIP model rates an image match to the text.

Preferably, the text is derived from player information such as a title of at least one computer simulation the player has an affinity for. The text can describe a game character accoutrement such as a mask. The instructions may be executable to generate the text from a starting phrase using learned ensuing phrases.

In another aspect, an apparatus includes at least one processor programmed with instructions to receive a text description, personalized to player data, of an accoutrement. The instructions are executable to, based at least in part on the text description, generate a virtual three dimensional (3D) accoutrement in less than two minutes after receipt of the text description, and present the virtual accoutrement on a display.

In another aspect, a method includes receiving text based on data pertaining to a player of a computer simulation, and generating a neural radiance field based on the text starting from a base model.

The details of the present application, both as to its structure and operation, can be best understood in reference to the accompanying drawings, in which like reference numerals refer to like parts, and in which:

BRIEF DESCRIPTION OF THE DRAWINGS

FIG. 9 illustrates a customized NeRF using a second descriptive phrase;
FIG. 10 illustrates a customized NeRF using a third descriptive phrase.

DETAILED DESCRIPTION

Figure 1:
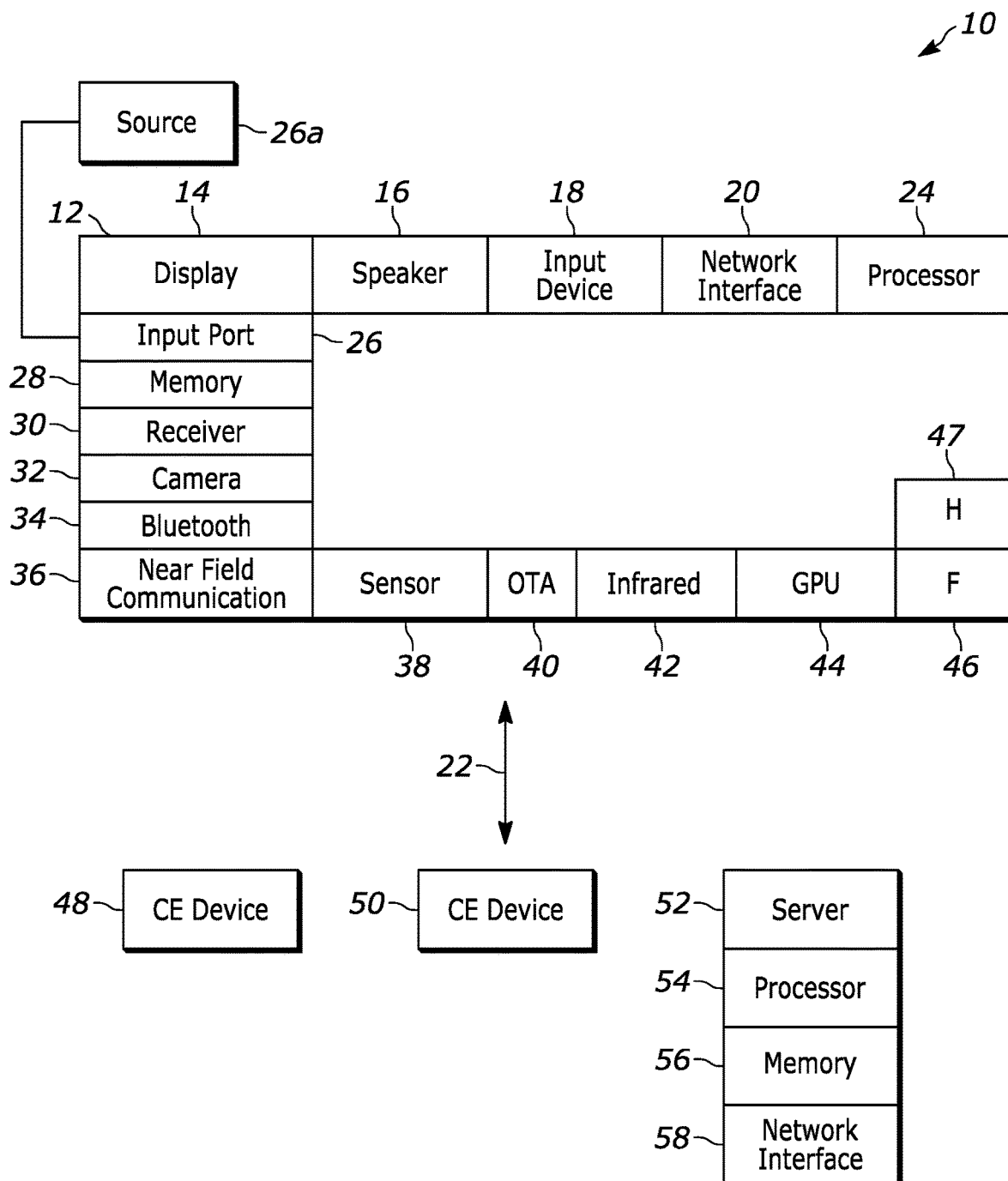
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
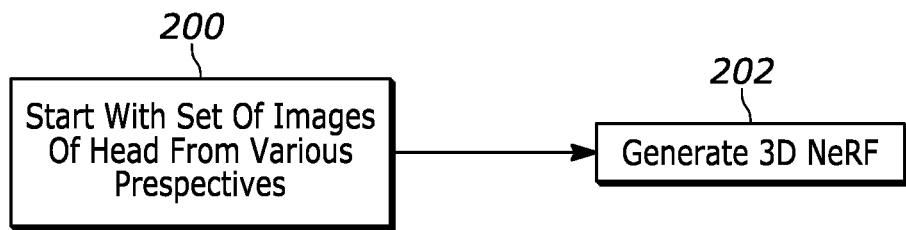
FIG. 2 illustrates example initial logic in example flow chart format.
Figure 3:
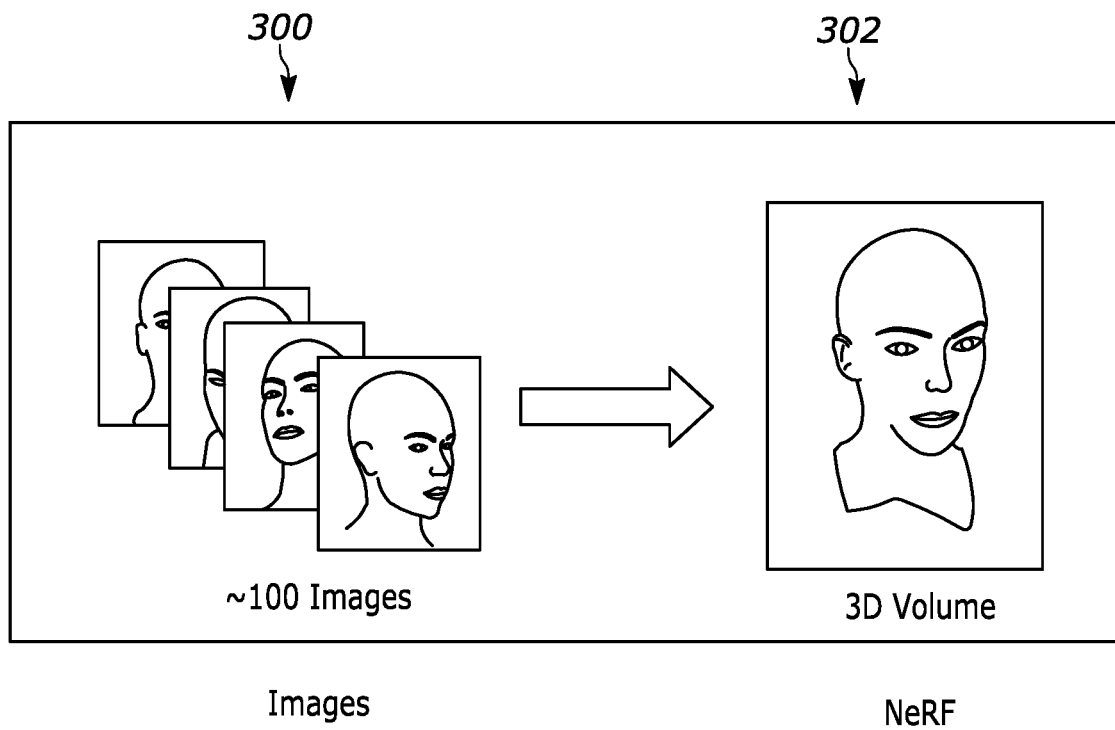
FIG. 3 illustrates creating a 3D neural radiance field (NeRF) representing a human head from 2D images.

Now refer to FIGS. 2 and 3. Initial logic that may be executed by any processor or processors herein commences at block 200 by receiving a set of images of a head (labeled 300 in FIG. 3), which may be 2D images of the same base head from respective different perspectives as may be generated by one or more artists. From those images, a 3D base head (302 in FIG. 3) is generated at block 202. The 3D base head 302 may be a 3D neural radiance field (NeRF), which may be thought of as a 3D volume stored in a machine learning (ML) model. In a specific example, the base head 302 may be a NeRF that can be trained quickly, in under two minutes and in some examples in under one minute from when the below-described text description is input, to produce the modified NeRF discussed further below. An example NeRF to this end is a NeRF encoded in a multi-resolution hash table the role of which is to store the location of sparse multiresolution 3D grid to speed up the training and rendering of NeRF.

Note that instead of images, in some embodiments, the base head 302 in FIG. 3 may be generated using a head scan of a real world head.

Figure 4:
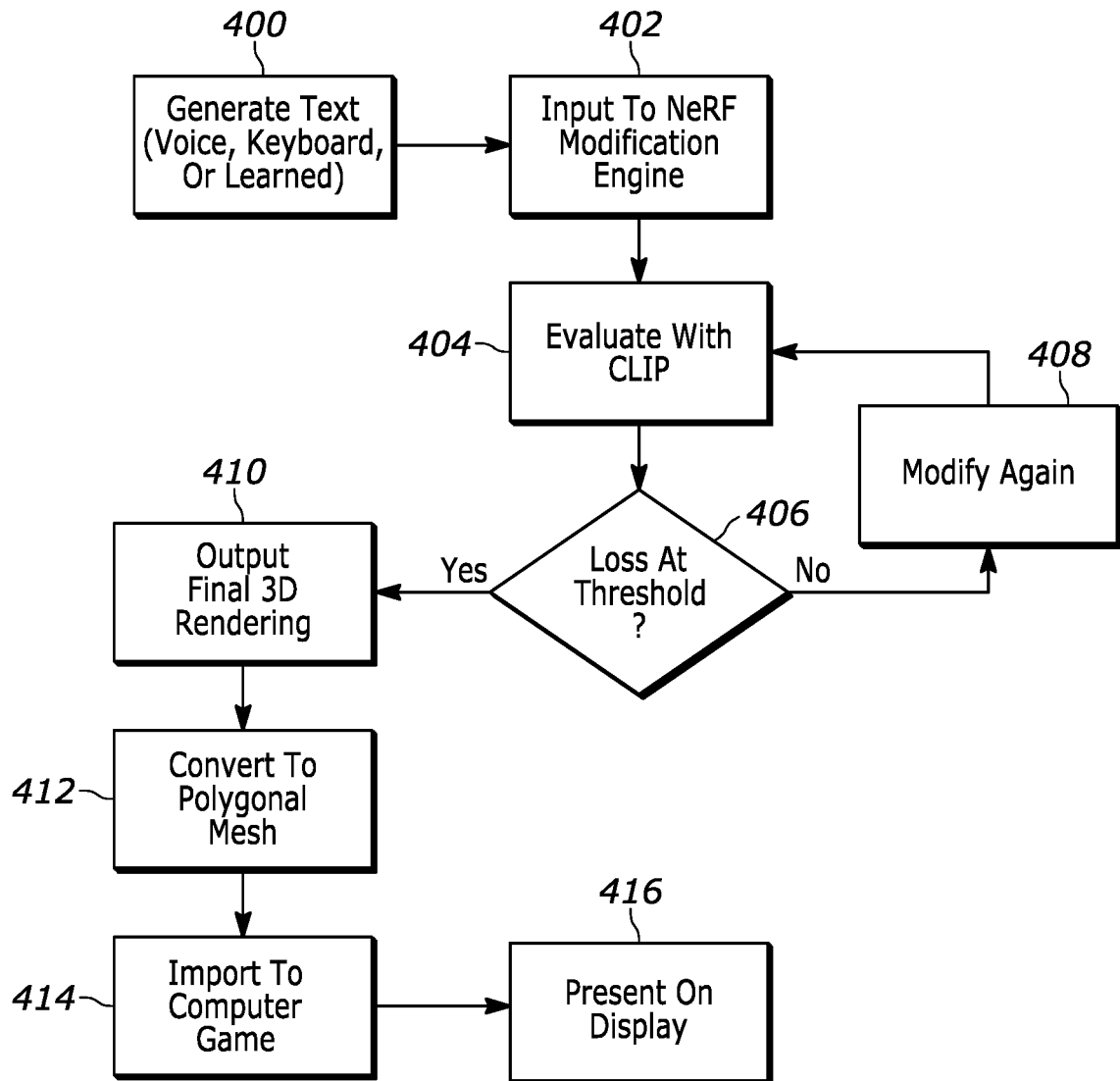
FIG. 4 illustrates example text-based NeRF customization logic in example flow chart format.

Turn now to FIG. 4. Once the base head 302 has been generated, a text description of a modified base head may be received of the desired head. The text may be input from a text input device such as a keyboard, and/or from voice-to-text conversion of a spoken description, and/or from an initial starting phrase followed by learned additional descriptive phrases as discussed further herein. Or, the text may be generated madlib style using more primitive algorithmic techniques, such that an answer to a survey may be inserted into the text describing the target head.

Moving to block 402, the text is input to a NeRF modification engine, which may include a fully connected (non-convolutional) deep network. The input to the modification engine can be single continuous 5D input including values representing three spatial dimensions and two viewing dimensions, while the output of the engine can include volume density and view-dependent emitted radiance at the spatial location represented by the associated 3D values.

Proceeding to block 404, the output of the NeRF modification engine, which can be thought of as a modified NeRF, is evaluated to determine how closely the output matches the input text description. In one example this evaluation may be made by a Contrastive Language-Image Pre-training (CLIP) model that rates an image match to the input text string. CLIP is an open-source model that scores how well a line of text matches an image. The CLIP model can be trained on image-text pairs such as photos with captions from the Internet using cosine similarity to score goodness of match. Thus, modification to the base NeRF is essentially steered using a loss function dependent on the text input to the CLIP model.

Decision diamond 406 indicates that if, after the current iteration of modification, it is determined that the loss has not achieved a threshold (target small) loss, the current iteration of the modified NeRF is again modified at block 408, and the logic loops back to block 404. However, once it is determined that the loss is sufficiently small, the logic moves to block 410 to output the final modified NeRF. Note that in lieu of a loss threshold, a set number of loops may be performed, e.g., one hundred. Blocks 402-408 may use gradient descent techniques.

In some example, the logic may next move to block 412 to convert the modified NeRF to a polygonal mesh, which can be imported at block 414 into a computer simulation such as a computer game and presented on a display during game play at block 416. Block 412 may also generate materials for the mesh such as albedo, roughness, and normal textures. The modified NeRF can be converted to a polygonal mesh with the same topology as the modified NeRF. This may be done using the marching cubes technique. Or, the modified NeRF can be converted to a polygonal mesh by essentially shrink wrapping the modified NERF by placing a mesh over the modified NERF and recording what parts of the mesh contact the surface of the modified NeRF when the mesh is emulated to be evacuated.

Figure 4A:
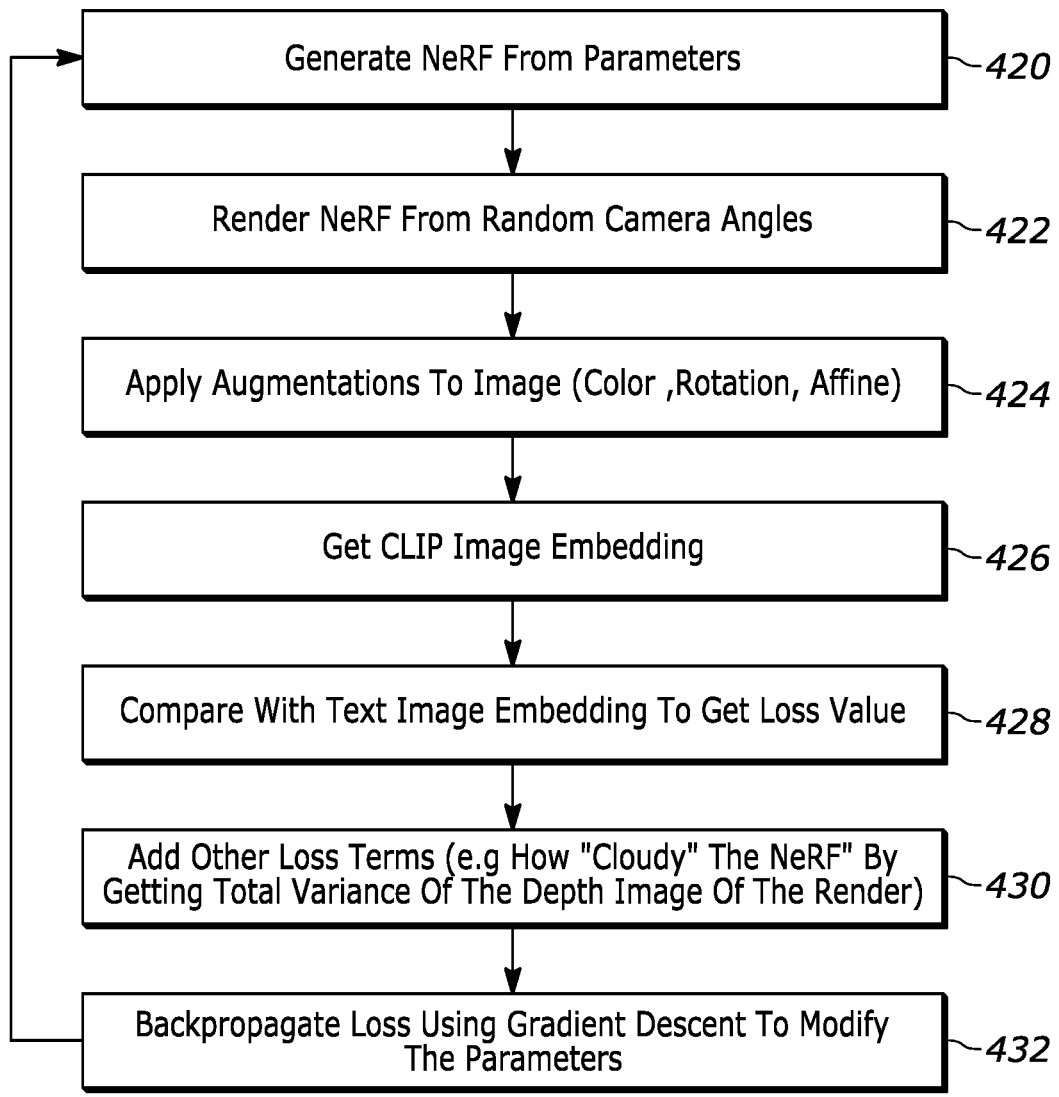
FIG. 4A is another representation of example logic.
Figures 5, 6, 7:
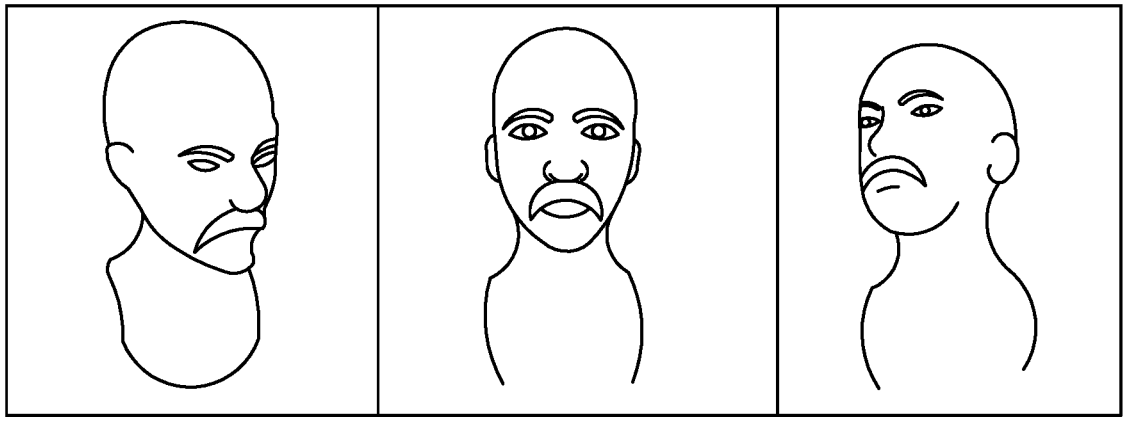
FIGS. 5-8 illustrate a customized NeRF using a first descriptive phrase.
Figure 8:
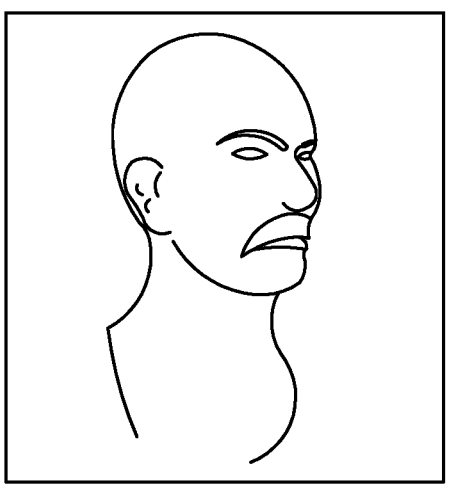

FIG. 4A is an alternate illustration. Commencing at block 420, a NeRF is generated from parameters that may include values that determine what the head looks like and that are tuned to make the final NeRF look like the input images. Moving to block 422, a the NeRF may be rendered from multiple camera angles and augmentations such as color, rotation, and affine applied at block 424.

Proceeding to block 426, CLIP image embedding can be retrieved and used at block 428 to compare the current iteration of the NeRF to the text image embedding to obtain a loss value. At block 430 the loss value is added to other terms such as how "cloudy" the NeRF is by obtaining a total variance of the depth of the image that is rendered. The total loss is back-propagated at block 432 using gradient descent if desired to modify the parameters at block 420.

FIGS. 5-8 illustrate four respective perspectives of a modified NeRF 500 that has been generated from the base NeRF 302 in FIG. 3 using the input text "photorealistic head of old tough guy". The modified NeRF 500 was generated in under two minutes from when the text was input to the model.

FIGS. 9 and 10 respectively illustrate modified NeRFs 900, 1000 that were respectively generated from the base NeRF 302 using the respective input texts "a photorealistic head of a sea monster" and "a photorealistic head of devil".

Figure 11:
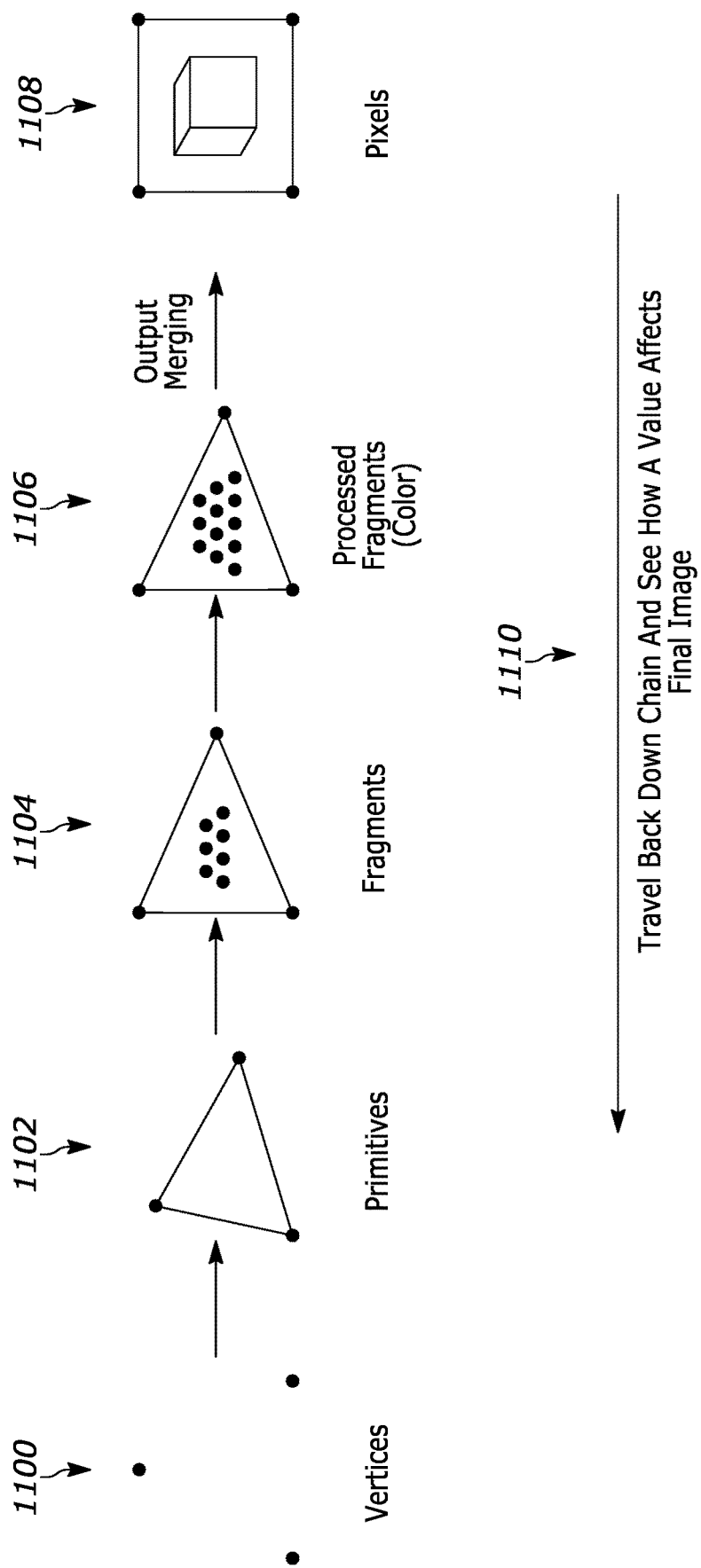
FIG. 11 illustrates a sequence of image generation steps for learning how to customize a generic NeRF.

FIG. 11 illustrates that the ML model described above, particularly for use with mesh techniques, may be trained on a chain of causality from initial parameters (variables) that control the vertices of an object to the pixels rendered onscreen. Starting with vertices 1100, the chain of causality can proceed to primitives 1102 that are based on the vertices 1100, and then further proceed to fragments 1104 in which the primitives are at least partially filled in, e.g., with textures. From the fragments 1104, processed fragments 1106 may be generated in which color can be added, with processed fragments 1106 merged into a pixel output 1108 that is presented onscreen. The arrow 1110 illustrates that this chain can be traversed back down to the original vertices 1100 to see how particular values in the chain affect the final pixel image 1108, which can be used to train the ML model.

Note that if a mesh of a head is used instead of a radiance field, the ML model may execute differentiable rendering in which the parameters may be varied to see real time how the variations affects the output image. The ML model uses a loss function to minimize the loss as the new face begins to match the target defined by the text.

Figure 12:
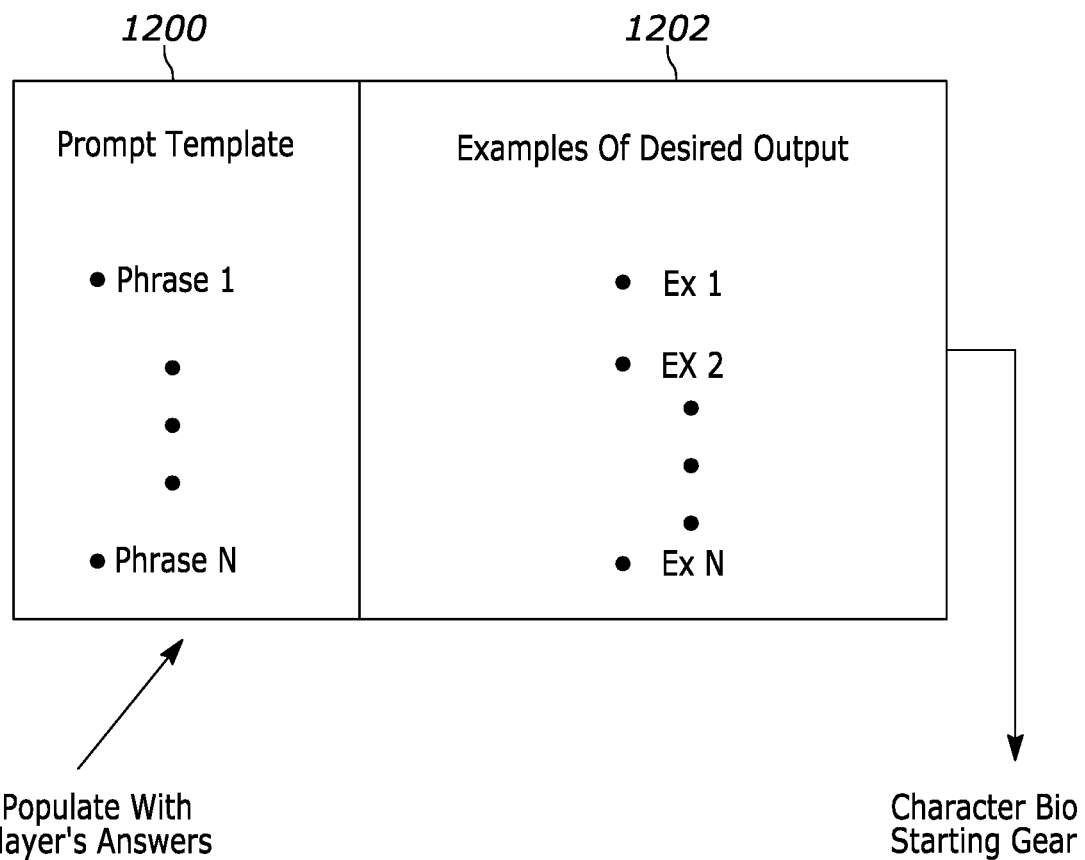
FIG. 12 illustrates a data structure for generating text.

As mentioned above, some or all of the input text describing the desired modified NeRF can be generated from a starting phrase using learned ensuing phrases. FIG. 12 illustrates. A prompt template 1200 may be presented on a developer's computer screen with multiple phrases that can be populated with the player/developer answers. Additional text 1202 can be presented for each prompted answer. The additional text 1202 may be generated by a ML model that is trained to complete sentences based on input phrases.

Figure 13:
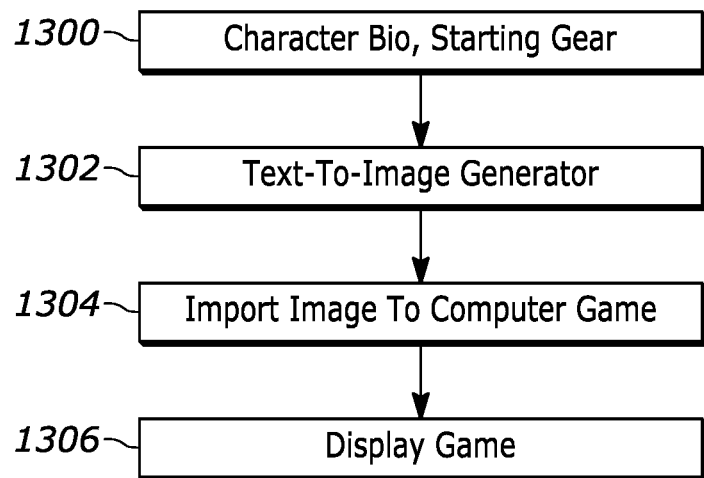
FIG. 13 illustrates additional example text-based NeRF customization logic in example flow chart format.

FIG. 13 illustrates additional technique. Commencing at block 1300, text is received indicating a character biography and gear the character is starting a game with. A text-to-image generator 1302 receives the text and generates an image consistent with principles herein, which is imported to a computer game at bock 1304 and presented while the game is played at block 1306. Note that block 1302 alternatively may use a text-to-3D mesh generator (such as the NeRF one) or images such as decals on a player's gear, but the more predominant use case is generating actual 3D assets in the form of mesh/materials.

It may now be appreciated that the modified 3D NeRF images from text are generated real time, not drawn, photoshopped, or found or preconceived. Instead, they are generated based on other text-based image generations.

Thus, present principles provide techniques for generating coherent 3D heads from text in a few minutes, e.g., two minutes or less or a minute or less. A new NeRF is generated with text in a specific domain by having a starting base model. The use of hash-table encoding of the NeRF facilitates rapid editing (~1 minute).

Turn now to FIG. 14-18, which illustrate the use of base models other than heads. For example, base models of in-game goods like hats or weapons may be used to produce hyper-personalized game items.

Figure 14:
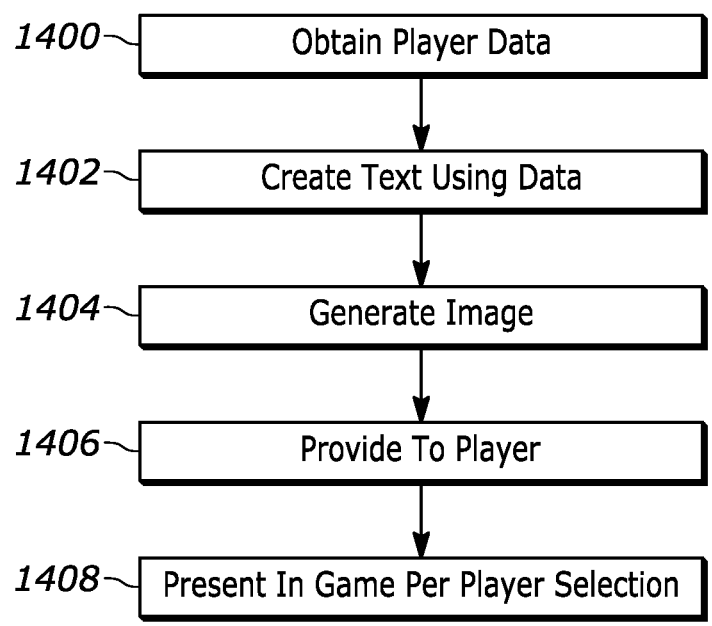
FIG. 14 illustrates example text-based accoutrement customization logic in example flow chart format.
Figures 15, 16:
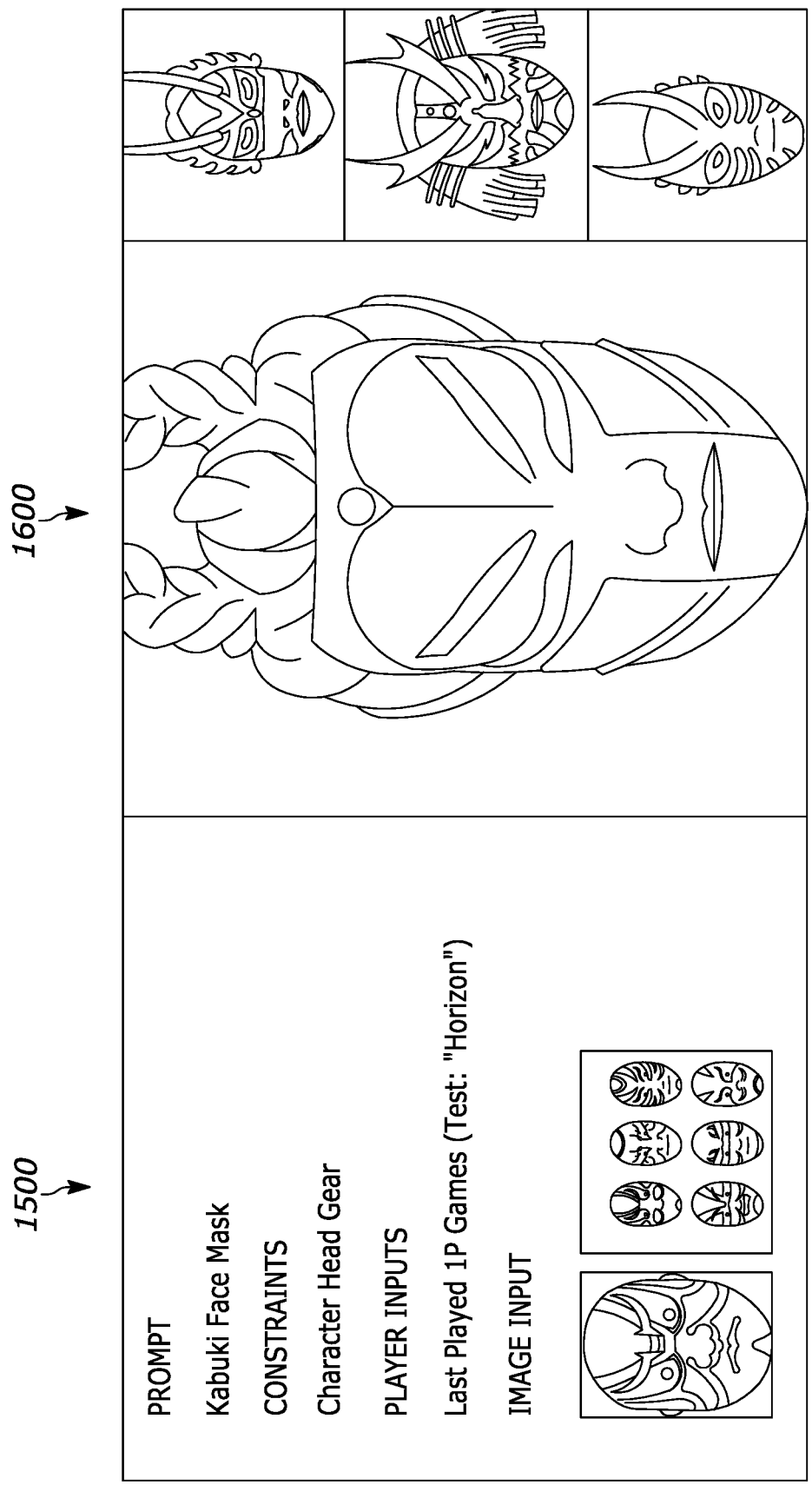
FIG. 15 illustrates and example screen shot consistent with FIG. 14.
FIG. 16 illustrates example player-customized game accoutrements consistent with FIG. 14.

Commencing at block 1400 in FIG. 14, player data is obtained for a specific individual player. Preferably the data is non-sensitive player data, such as previous first-party games played, to generate one-of-a-kind in-game items.

Moving to block 1402, text is created based on the data from block 1100. For instance, if the player data indicates that the player is a fan of Game X, the system creates a text prompt containing or related to "Game X" that is used at block 1404 consistent with present principles to generate an image of an accoutrement such as different in-game masks that can be presented on a display of the player at block 1406 and, if desired, presented on the player's character during game play at block 1408 based on, e.g., player acceptance. The image may include materials such as texture data.

The text generator can be fairly primitive. For instance, the final text prompt 1500 shown in FIG. 15 (presented on screen alongside of the ensuing image 1600 in FIG. 16) is "kabuki face mask" and can include "based on [character Y] from [Game X]. A generic prompt can be "[style] face mask based on [character] from [game] ([year released])."

Figure 17:
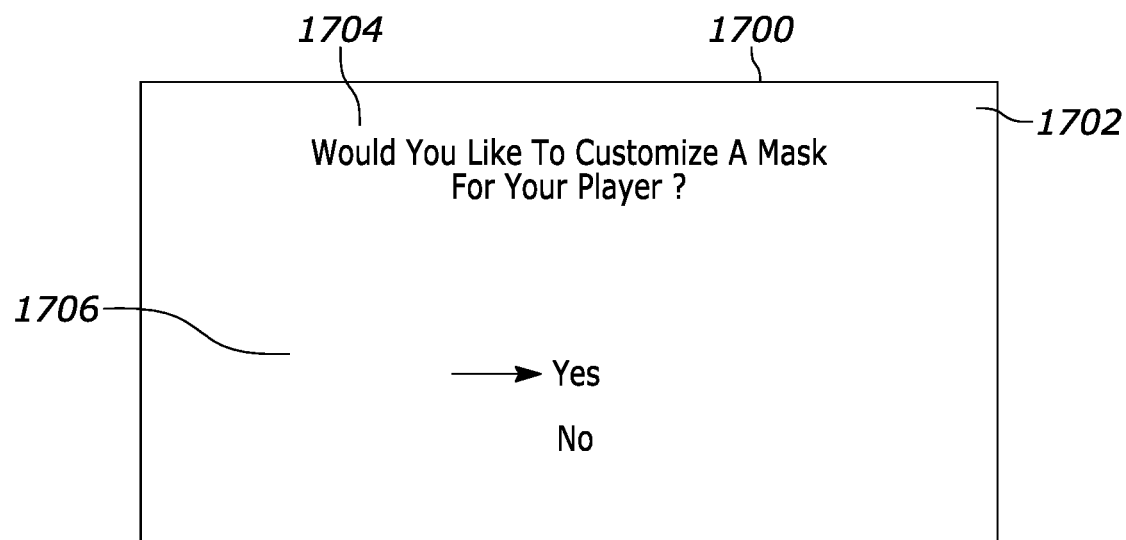
FIGS. 17 and 18 illustrate example screen shots of providing customized accoutrements for a specific player.
Figure 18:
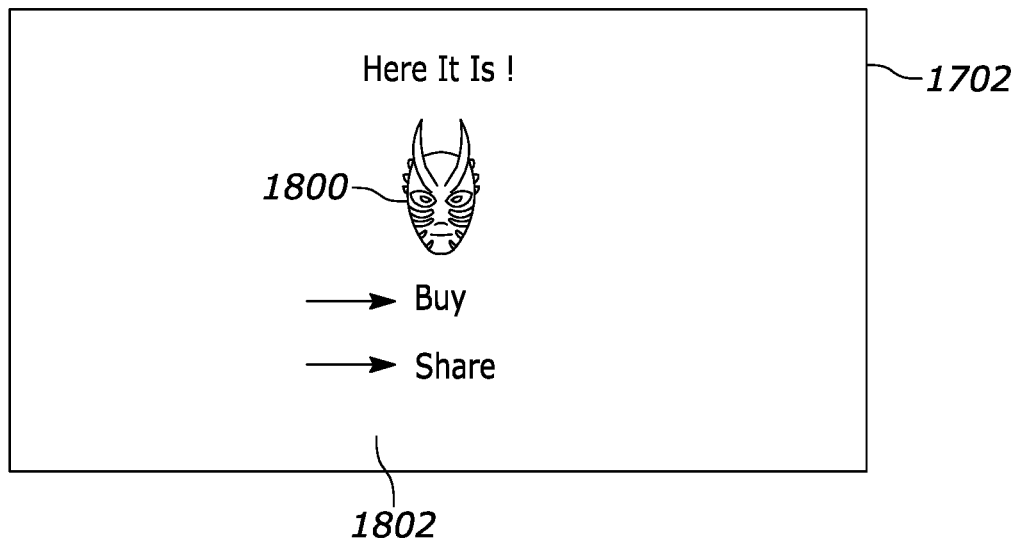

FIGS. 17 and 18 illustrate further. A user interface (UI) 1700 may be presented on a player's display 1702 prompting (1704) the player whether the player wishes to customize an accoutrement, in this case, a mask, for the player's character (PC). One or more selectors 1706 may be presented allowing the player to accept or not. If the player accepts, text input may be generated automatically consistent with principles above to generate an image of the accoutrement, which can be presented at 1800 in FIG. 18 for the player to view.

FIG. 18 further illustrates that selectors 1802 may be presented to allow the player certain options, including the option to buy the custom-made accoutrement so that no other player will be offered the same accoutrement. The player may also wish to share the accoutrement with other players.

The tools and techniques above may be provided in end user game computing devices such as computer game consoles so that end user game players can use the tools described herein in game (i.e., as part of playing a computer game) to create and/or modify game objects for each other.

While the particular embodiments are herein shown and described in detail, it is to be understood that the subject matter which is encompassed by the present invention is limited only by the claims.

What is claimed is:

1. A device comprising:
   at least one computer storage that is not a transitory signal and that comprises instructions executable by at least one processor to:
   generate, using a neural radiance field (NeRF) model, a base three dimensional (3D) asset from a plurality of two dimensional (2D) images;
   generate text input based on at least one of user information about a user of the base 3D asset or game information about a video game presenting the base 3D asset;
   use the text input to a Contrastive Language-Image Pre-training (CLIP) model to generate a modified 3D asset from the base 3D asset; and
   convert the modified 3D asset to a polygonal mesh representing a virtual character accoutrement for presentation of the virtual character accoutrement in at least one computer simulation; and
   cause the modified 3D asset to be presented on a display.

2. The device of claim 1, wherein the CLIP model rates an image match to the text input.

3. The device of claim 2, wherein the text input is derived from player information.

4. The device of claim 3, wherein the player information comprises a title of at least one computer simulation.

5. The device of claim 1, wherein the text input describes a character accoutrement.

6. The device of claim 5, wherein the character accoutrement comprises a mask.

7. The device of claim 1, wherein the instructions are executable to: generate the text input from a starting phrase using learned ensuing phrases.

8. The device of claim 1, comprising the at least one processor.

9. The device of claim 1, wherein the text input is based on interaction information about a user's answers to questions about the base 3D asset.

10. A method, comprising:
    generating, using a neural radiance field (NeRF) model, a base three dimensional (3D) asset from a plurality of two dimensional (2D) images;
    generating text input based on at least one of user information about a user of the base 3D asset or game information about a video game presenting the base 3D asset;
    using the text input to a Contrastive Language-Image Pre-training (CLIP) model to generate a modified 3D asset from the base 3D asset; and
    converting the modified 3D asset to a polygonal mesh representing a virtual character accoutrement for presentation of the virtual character accoutrement in at least one computer simulation; and
    causing the modified 3D asset to be presented on a display.

11. The method of claim 10, wherein the CLIP model rates an image match to the text input.

12. The method of claim 11, wherein the text input is derived from player information.

13. The method of claim 12, wherein the player information comprises a title of at least one computer simulation.

14. The method of claim 10, wherein the text input describes a character accoutrement.

15. The method of claim 14, wherein the character accoutrement comprises a mask.

16. The method of claim 10, further comprising:
    generating the text input from a starting phrase using learned ensuing phrases.

17. The method of claim 10, comprising at least one processor.

18. The method of claim 10, wherein the text input is based on interaction information about a user's answers to questions about the base 3D asset.

19. A non-transitory computer-readable medium storing a plurality of instructions that, when executed by one or more processors of a computing device, cause the one or more processors to perform operations to:
    generate, using a neural radiance field (NeRF) model, a base three dimensional (3D) asset from a plurality of two dimensional (2D) images;
    generate text input based on at least one of user information about a user of the base 3D asset or game information about a video game presenting the base 3D asset;
    use the text input to a Contrastive Language-Image Pre-training (CLIP) model to generate a modified 3D asset from the base 3D asset; and
    convert the modified 3D asset to a polygonal mesh representing a virtual character accoutrement for presentation of the virtual character accoutrement in at least one computer simulation; and
    cause the modified 3D asset to be presented on a display.

20. The non-transitory computer-readable medium of claim 19, wherein the operations further comprise the CLIP model rating an image match to the text input.

* * * * *